US008892362B2

(12) United States Patent
Brady et al.

(10) Patent No.: US 8,892,362 B2
(45) Date of Patent: Nov. 18, 2014

(54) SYSTEM AND METHOD FOR IMPROVING SURFACE ELECTROMAGNETIC SURVEYS

(71) Applicant: Schlumberger Technology Corporation, Sugar Land, TX (US)

(72) Inventors: James P. Brady, Houston, TX (US); Andrew Hawthorn, Missouri City, TX (US); John P. Horkowitz, Sugar Land, TX (US); Jean Seydoux, Rio de Janeiro (BR); Jacques R. Tabanou, Houston, TX (US); Jian Yang, Sugar Land, TX (US); David L. Alumbaugh, Berkeley, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/023,194

(22) Filed: Sep. 10, 2013

(65) Prior Publication Data

US 2014/0019051 A1  Jan. 16, 2014

Related U.S. Application Data

(62) Division of application No. 12/746,746, filed as application No. PCT/US2008/086525 on Dec. 12, 2008, now Pat. No. 8,532,928.

(60) Provisional application No. 61/014,691, filed on Dec. 18, 2007.

(51) Int. Cl.
| | |
|---|---|
| *G01V 1/30* | (2006.01) |
| *G01V 11/00* | (2006.01) |
| *G01V 3/38* | (2006.01) |
| *G01V 3/12* | (2006.01) |
| *G01V 3/08* | (2006.01) |

(52) U.S. Cl.
CPC *G01V 3/38* (2013.01); *G01V 11/00* (2013.01); *G01V 3/12* (2013.01); *G01V 3/083* (2013.01); *G01V 2210/6163* (2013.01)
USPC .................................. 702/7; 703/10

(58) Field of Classification Search
CPC .................... G01V 2210/626; G01V 3/083
See application file for complete search history.

(56) References Cited

U.S. PATENT DOCUMENTS

| | | | |
|---|---|---|---|
| 3,743,034 A | 7/1973 | Bradley | |
| 5,656,930 A * | 8/1997 | Hagiwara | 324/339 |

(Continued)

FOREIGN PATENT DOCUMENTS

| | | |
|---|---|---|
| EP | 0728909 A2 | 8/1996 |
| WO | 0061916 A1 | 10/2000 |
| WO | 0068542 A1 | 11/2000 |
| WO | 0120366 A1 | 3/2001 |
| WO | 03052237 A1 | 6/2003 |
| WO | 2005085909 A1 | 9/2005 |
| WO | 2006096328 A2 | 9/2006 |

OTHER PUBLICATIONS

Zhang Z. et al., "Inversions of Surface and Borehole Data From Large-Loop Transient Electromagnetic System Over a 1-D Earth", Geophysics, Society of Exploration Geophysicists, vol. 66(4), Jul. 2001: pp. 1090-1096.

(Continued)

*Primary Examiner* — John Breene
*Assistant Examiner* — Timothy H Hwang
(74) *Attorney, Agent, or Firm* — Kimberly Ballew

(57) ABSTRACT

A technique provides a methodology for improving surveys of subterranean regions. The methodology comprises estimating macro anisotropy and an intrinsic or micro anisotropy of an overburden. A surface electromagnetic survey is conducted, and the data from the survey is inverted based on or including information gained from estimating the macro anisotropy and/or intrinsic anisotropy. A processor system can be used to conduct the inversion with the adjustments for anisotropy to improve the information provided by the survey.

11 Claims, 9 Drawing Sheets

(56) References Cited

U.S. PATENT DOCUMENTS

| | | | |
|---|---|---|---|
| 6,760,666 B2* | 7/2004 | Hagiwara | 702/7 |
| 6,819,111 B2 | 11/2004 | Fanini et al. | |
| 7,565,245 B2* | 7/2009 | Andreis et al. | 702/7 |
| 7,860,655 B2* | 12/2010 | Alumbaugh et al. | 702/11 |
| 8,532,928 B2 | 9/2013 | Tabanou et al. | |
| 2002/0173914 A1* | 11/2002 | Zhang et al. | 702/7 |
| 2003/0052685 A1 | 3/2003 | Ellingsrud et al. | |
| 2004/0059515 A1 | 3/2004 | Kennedy | |
| 2005/0251340 A1* | 11/2005 | Tompkins | 702/2 |
| 2007/0127315 A1 | 6/2007 | Tompkins | |
| 2007/0257677 A1 | 11/2007 | Wang | |
| 2008/0228401 A1 | 9/2008 | Zhou et al. | |
| 2009/0005994 A1 | 1/2009 | Srnka et al. | |
| 2009/0082970 A1 | 3/2009 | Andreis et al. | |
| 2009/0157367 A1* | 6/2009 | Meyer et al. | 703/10 |

OTHER PUBLICATIONS

Hoversten, G. et al., 3D Modeling of a deepwater EM exploration survey, Geophysics, SEG, vol. 71(5), Sep./Oct. 2006: pp. G239-G248.

Definition of "Measurements-While-Drilling", Schlumberger Oilfield Glossary, http://www.glossary.oilfield.slb.com/Display.efm?Term=measurements%20while%20drilling, Last accessed (Aug. 2, 2012).

International Search Report of PCT Application No. PCT/US2008/086525 dated Jun. 10, 2009: pp. 1-5.

\* cited by examiner

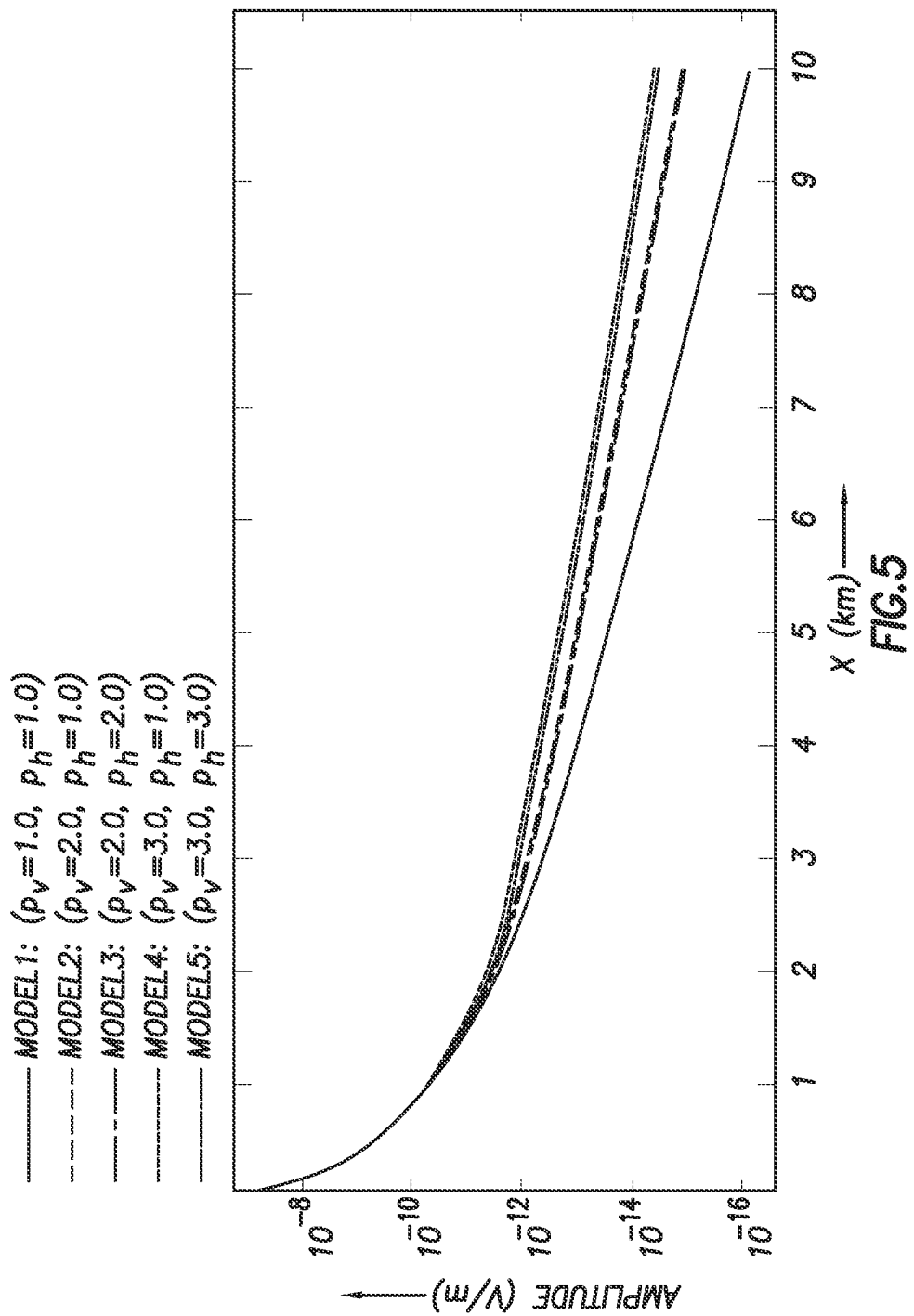

SYSTEM AND METHOD FOR IMPROVING SURFACE ELECTROMAGNETIC SURVEYS

CROSS-REFERENCE TO RELATED APPLICATIONS

The present application is a divisional of U.S. patent application Ser. No. 12/746,746 filed Jun. 7, 2010, now U.S. Pat. No. 8,532,928 issued Sep. 10, 2013; which is a U.S. National Stage Application under 35 U.S.C. §371 and claims priority to PCT Application No. PCT/US2008/086525; which claims the benefit of U.S. Provisional Patent Application Ser. No. 61/014,691 filed Dec. 18, 2007. All of these applications are incorporated herein by reference in their entireties.

BACKGROUND

In exploring for hydrocarbons, a variety of techniques are employed to gain a better understanding of the subterranean environment. For example, the resistivity of reservoirs below the ground surface or seafloor has been detected to facilitate exploration for hydrocarbon. In some operations, controlled source electromagnetic surveys are used to help confirm the presence of a resistive fluid, e.g., liquid or gas, within a favorable hydrocarbon trap structure which may indicate the presence of hydrocarbons. Magnetotelluric surveys also have been used to produce subsurface structural images in certain environments. However, the electromagnetic survey interpretations often fail to sufficiently account for resistive anisotropy, the difference in horizontal and vertical electrical resistivities of a subsurface volume of earth. Inversion of the surface electromagnetic survey data can yield substantial error due to the non-uniqueness of inversion models fitting the observed data with many parameters unconstrained.

In some environments, seismic surveys also can be used to measure the acoustic response of the earth and its specific structure or layering. However, acoustic information does not help discriminate between the type of liquid because the propagation difference varies little between fluids. Seismic surveys also do not enable identification of well gas saturations because acoustic propagation through small quantities or large quantities of gas is similar. Other measurements also have been used to help gain a better understanding of the subterranean structures and potential reservoirs. However, such techniques and measurements also fail to sufficiently account for anisotropy of the overburden.

SUMMARY

In general, the present disclosure provides a methodology for improving surveys of subterranean regions. The methodology comprises estimating a macro anisotropy and an intrinsic or micro anisotropy of an overburden. The method also comprises conducting a surface electromagnetic survey. The data from the survey is inverted based on or including information from the estimation of macro anisotropy and intrinsic anisotropy. A processor system can be used to conduct the inversion and make adjustments for anisotropy as new information becomes available, or after all information has been acquired.

BRIEF DESCRIPTION OF THE DRAWINGS

Certain embodiments of the invention will hereafter be described with reference to the accompanying drawings, wherein like reference numerals denote like elements, and:

FIG. 5 is a graph illustrating the effects of anisotropy via various models, according to an embodiment of the present invention;

DETAILED DESCRIPTION

Figure 3:
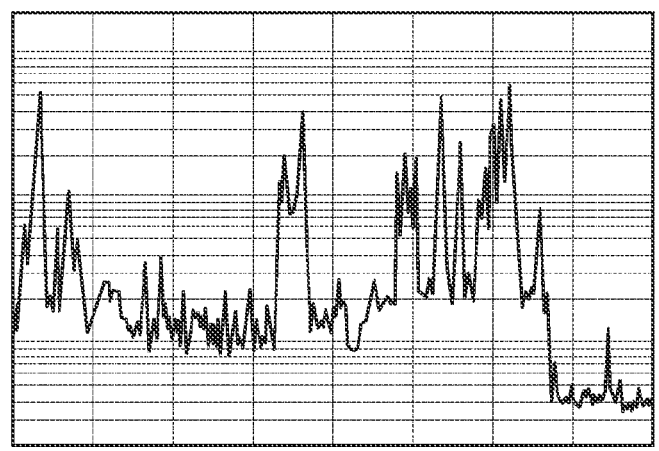
FIG. 3 is a graphical representation of anisotropy at a macro scale, according to an embodiment of the present invention.

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a methodology and system for improving surveys of subterranean regions. Various measurements can be made to obtain well data either while drilling or after drilling and this data can be combined with surface survey information to improve those surveys. For example, the additional measurements can help improve an electromagnetic survey inversion process by providing constraints on anisotropy to help constrain the model search space. Additionally, surface or borehole seismic technology can be used to help localize the position of a reservoir and thus reduce the scope of the inversion to a problem of property, e.g., hydrocarbon saturation, rather than a problem of both location and properties. In one embodiment, the technique is carried out as the well is being drilled in a manner such that the updated model/survey can yield a new target position for the well.

Generally, the present methodology provides a new approach for inverting surface electromagnetic surveys. The inversion is facilitated based on an estimation of both the macro anisotropy as well as the intrinsic anisotropy of the overburden. The estimation of anisotropy, $\lambda$, may be obtained by specific electromagnetic measurements conducted inside the well while the well is being drilled or after the well has been drilled. By way of example, electromagnetic measurements can be performed inside the borehole with a tilted coil or azimuthal propagation tool. One specific example is the PeriScope™ tool, available from Schlumberger Technology Corporation. By way of further example, specific electromagnetic measurements can be performed after the well has been drilled using, for example, a tri-axial resistivity tool that can be used irrespective of the mode of conveyance and telemetry, which may comprise wire telemetry, mud pulse telemetry, electromagnetic telemetry, acoustic telemetry, wired drill pipe, or other telemetry techniques. One specific example of a tri-axial resistivity tool is the RtScanner™ tool, available from Schlumberger Technology Corporation.

Azimuthal propagation tools, e.g., the Periscope™ tool, utilize both axial and transverse transmitters along with tilted receivers. This type of combination enables the tool to acquire measurements that are not subject to the limitations of non-azimuthal propagation tools. For example, in conventional propagation resistivity tools, the magnetic moments of transmitters and receivers are oriented axially with respect to the tool axis. The measurements made via such tools are, roughly speaking, only sensitive or affected by the anisotropy when the relative dip angle is greater than 45 degrees. This can be better understood in the case of a vertical well in which the induced current is parallel to the horizontal plane, and therefore the response does not carry information about the vertical resistivity. Additionally, with conventional propagation resistivity tools, the vertical resistivity and the relative dip angle are coupled and therefore even in relatively high dip angle situations, simultaneous determination of horizontal resistivity, vertical resistivity, and the relative dip angle is not possible for homogeneous formations.

The azimuthal propagation tools and the tri-axial resistivity tools provide an accurate location of bed boundaries. Additionally, the tools provide an accurate estimate of horizontal resistivity and vertical resistivity as well as the layer dip information that can be used to define a more accurate background resistivity model. Furthermore, in one embodiment of the present methodology, a layered model is constructed based on structural information from seismic interpretation and from resistivity distribution obtained via bed boundary location, horizontal resistivity, vertical resistivity, and layer dip data estimated from wellbore measurements. The estimation of the layer dip, for example, improves the modeling of the background resistivity whenever the layers of the overburden are not horizontal.

Figure 1:
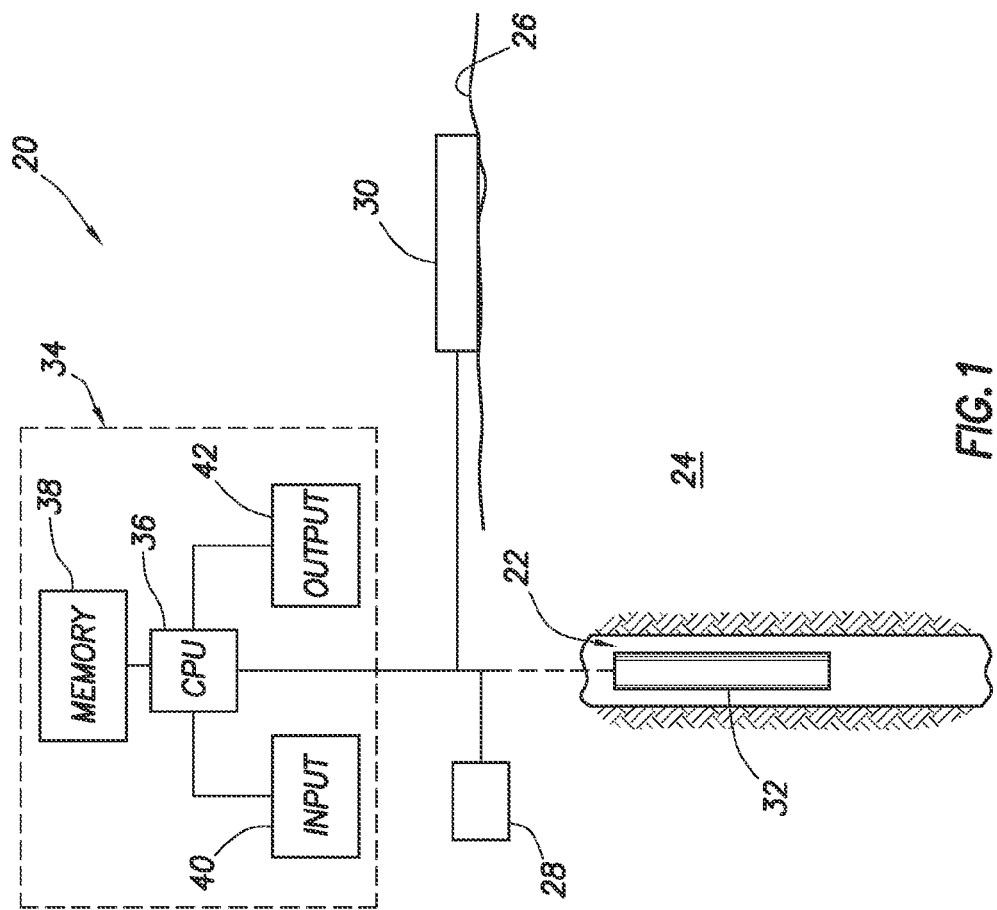
FIG. 1 is a schematic illustration of a system for improving surveys of subterranean regions, according to an embodiment of the present invention.

Referring generally to FIG. 1, a survey system 20 is illustrated according to one embodiment of the present invention. Survey system 20 is designed for use in improving surveys of subterranean regions and may comprise a variety of tools and sensor systems. The sensor systems and tools can be used in a borehole 22, which is formed in a subterranean region 24, or at other locations, such as a surface location 26. For example, well system 20 may comprise electromagnetic survey systems 28, seismic survey systems 30, borehole tools 32, and other tools for performing desired measurements and obtaining data to improve the knowledge associated with subterranean region 24.

The various tools and systems may incorporate many types of sensors and tools, including the azimuthal propagation tools and/or the tri-axial resistivity tools discussed above. By way of further example, the electromagnetic survey system 28 may comprise controlled source electromagnetic survey systems and/or magnetotelluric survey systems. The seismic survey systems 30 also may be constructed in a variety of sizes and configurations. Similarly, the borehole tools 32 may incorporate additional sensors, such as gravity sensors, and other parameter sensors for obtaining information regarding subterranean region 24. The borehole tools 32 may be designed as measurement-while-drilling and/or logging-while-drilling tools to obtain measurements during the drilling of borehole 22. In some applications, the borehole tools 32 also can be designed for use after borehole 22 is drilled.

The illustrated well system 20 further comprises a processor based system 34 in communication with the various other sensors/tools of well system 20. For example, processor system 34 may be designed to receive data from electromagnetic survey systems 28, seismic survey systems 30, and borehole tools 32. Some or all of the methodology outlined herein may be carried out by the processor based system 34. By way of example, processor based system 34 is an automated system that may be a computer-based system having a central processing unit (CPU) 36. CPU 36 may be operatively coupled to system/tools 28, 30 and 32. In the illustrated example, processor system 34 further comprises a memory 38 as well as an input device 40 and an output device 42. Input device 40 may comprise a variety of devices, such as a keyboard, mouse, voice-recognition unit, touchscreen, other input devices, or combinations of such devices. Output device 42 may comprise a visual and/or audio output device, such as a display having a graphical user interface for conveying information, e.g., evaluations of the subterranean region. Additionally, the processing may be done on a single device or multiple devices at the survey location, away from the survey location, or with some devices located at the survey location and other devices located remotely.

The tools and systems of overall survey system 20 may be employed in a variety of ways to gather information that can be used to improve the results from inversion of survey data. For example, seismic survey system 30 may be used in conducting seismic surveys designed to measure the acoustic response of the earth and thus its structure or layering. The acoustic properties from the seismic survey can help identify the presence of liquid or gas because the propagation differences of sound through liquid, gas, and solid vary dramatically.

Furthermore, the measurement or estimation of resistivity in subterranean region 24 can help discriminate between conductive and resistive fluids providing there is sufficient contrast between those fluids and the host rock. The resistivity can serve as a differentiator between resistive hydrocarbon and conductive water, for example. The combination of resistivity measurements and seismic survey data can be interpreted to help rank drilling prospects by assessing the likelihood of a liquid, gas, or even solid gas hydrate bearing structure, as well as the likelihood of the liquid or gas being an economically viable hydrocarbon. Additional measurements, such as gravity measurements, can be used to facilitate complementary data collection in specific environments, such as environments in which acoustic propagation is poor (e.g., under salt). Many of these measurements of subsurface properties can be obtained while drilling borehole 22 and/or after drilling has been completed via, for example, wireline logs.

The surface electromagnetic surveys, such as controlled source electromagnetic surveys and magnetotelluric surveys, are employed to collect information on subterranean region 24. For example, the surface electromagnetic surveys can be inverted to gain an improved delineation of a reservoir body buried below an unknown overburden. Other measurements, such as surface or airborne gravity can be used and inverted jointly with other surface measurements to also achieve a better delineation of the reservoir body buried below an unknown overburden.

To remove the primary field due to the direct coupling of the transmitter to the receiver in electromagnetic surveys, one can assume a homogeneous background resistivity below surface or utilize a simple 2D or 3D representation of the reservoir body embedded in it at a predicted position. The predicted position can be determined by 3D seismic survey data combined with knowledge of the local geology. Typically, the electromagnetic response of the earth as measured by a set of seafloor or surface land receivers is modeled with and without an embedded resistive reservoir body when, for example, a controlled source electromagnetic source is applied at a particular point or set of surface points, e.g., along a towline. A survey can then be acquired and a determination can be made as to whether the observed receiver responses bear the most similarity to the resistive reservoir or the non-resistive reservoir model. Inversion of the data can lead to an interpretation of the spatial distribution of sub-surface resistivity given all of the receiver and source data.

In the case of magnetotelluric surveys, the electromagnetic source is effectively the natural background radiation of the atmosphere, a combination of solar events, i.e., flares, and atmospheric events, such as lightning. Modeling is performed prior to a magnetotelluric survey based on knowledge of local geology and sometimes on pre-existing seismic surveys. Survey stations are planned and data is acquired. 1D, 2D and 3D inversion of the magnetotelluric data can be constrained by structural boundaries obtained from the surface seismic data and other possible existing well data. The electromagnetic surveys may be utilized in an exploration phase often before a first well is drilled. Inverting for the location, shape, volume and resistivity of the reservoir body yields a multiplicity of non-unique solutions and thus large uncertainties which can be addressed by the present methodology.

Large errors can be found when inverting the parameters of these deeply buried reservoirs due to, for example, poor representation of background resistivity. The presence of resistive or conductive layers which contrast greatly from the assumed homogeneous background resistivity can introduce significant errors in surface electromagnetic inversion.

Figure 2:
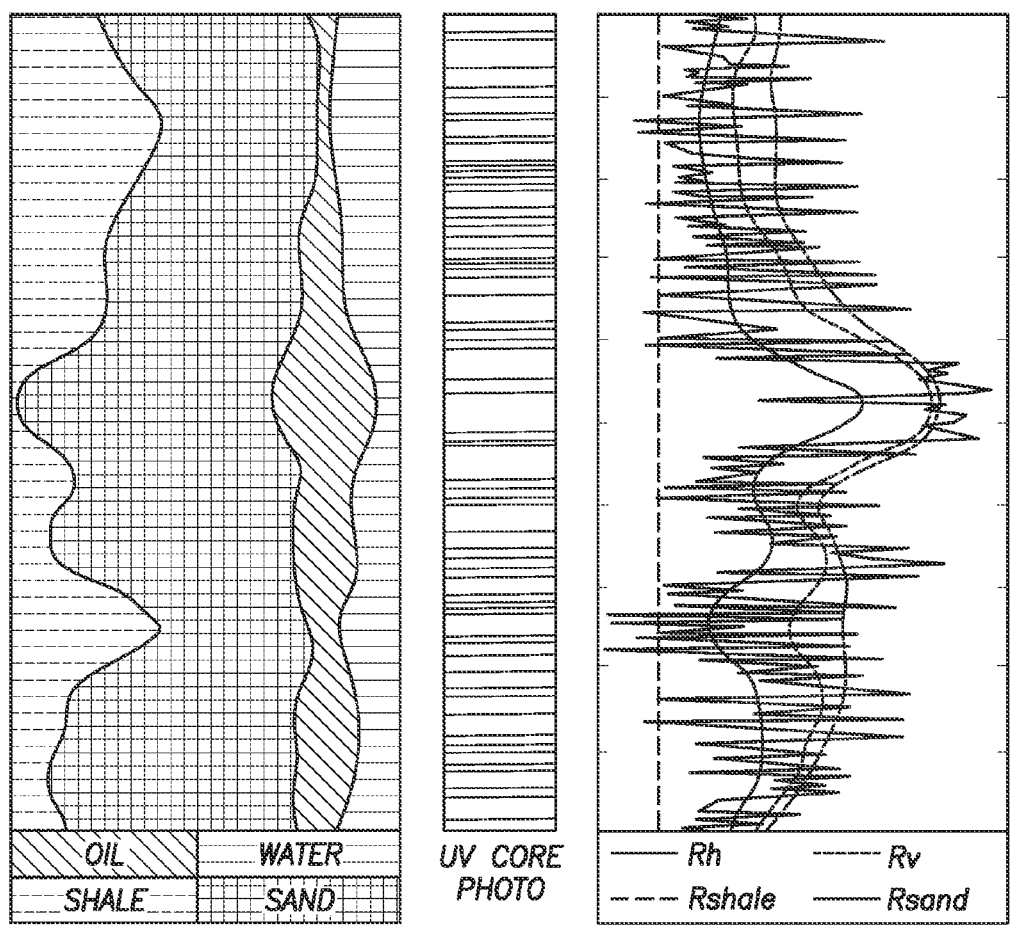
FIG. 2 is a graphical representation of anisotropy at a micro scale, according to an embodiment of the present invention.
Figure 4:
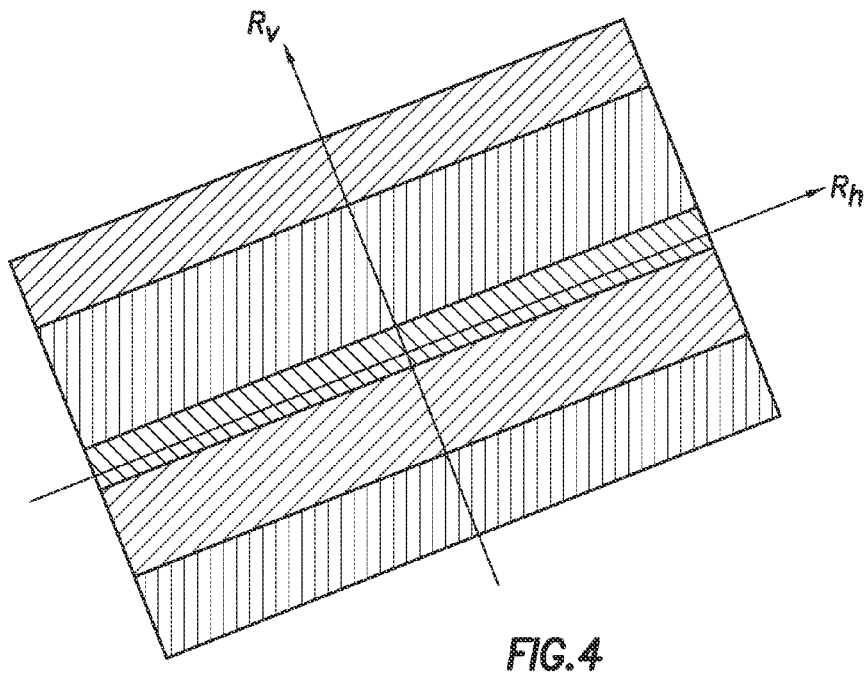
FIG. 4 is a graphical representation of vertical resistivity and horizontal resistivity, according to an embodiment of the present invention.

The effects of such resistivity layering can be represented by a macro anisotropy coefficient. The material of subterranean region 24 can be anisotropic at a microscale, as represented by FIG. 2, or at a macro scale, as represented by FIG. 3, which shows an example of a resistivity log over a 400 foot section. For a specific distribution of layers with different resistivity, a horizontal resistivity Rh is associated with being the harmonic average of the layer resistivity weighted by the relative thickness of each layer. A vertical resistivity Rv is associated with being the arithmetic average of the layer resistivity weighted by the relative thickness of each layer, as illustrated graphically in FIG. 4.

The horizontal resistivity term Rh is a general term to characterize the resistivity parallel to a bedding and is horizontal when the bedding lies flat in a horizontal plane. The vertical resistivity term Rv is a general term used to characterize the resistivity perpendicular to the bedding and is vertical when the bedding lies flat in the horizontal plane. The resistivity anisotropy coefficient $\lambda$ can be defined as $\lambda=\sqrt{Rv/Rh}$.

Figure 6:
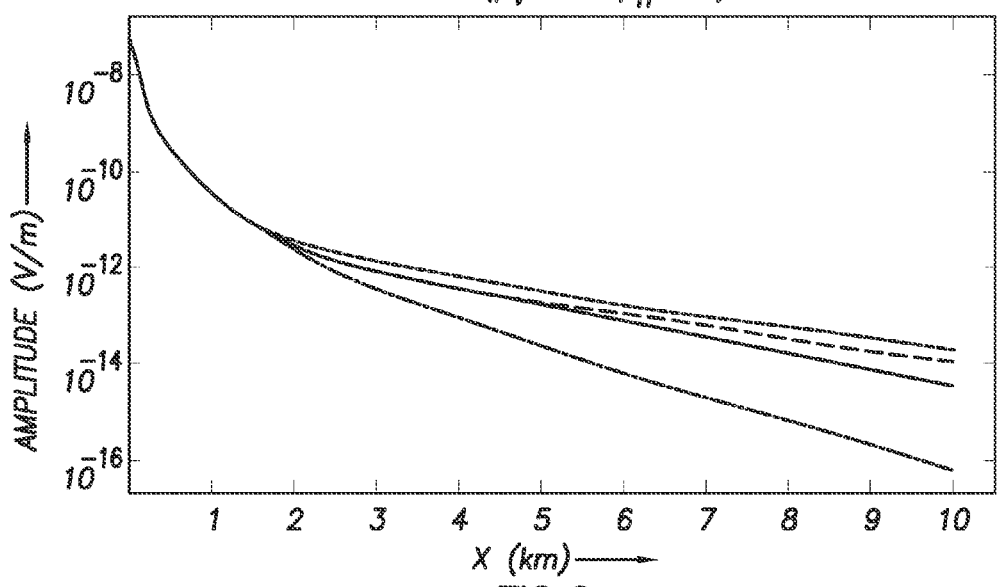
FIG. 6 is an example in graph form representing responses from a reservoir filled with a fluid, according to an embodiment of the present invention.

Referring generally to FIG. 5, a graphical example is provided regarding the effects of anisotropy on the x field measured away from a transmitter during a survey. Graph lines are provided according to a variety of different models. In FIG. 6, a graphical example is provided of responses received according to a variety of models. In this particular example, the responses are based on a 100 m thick reservoir filled with a fluid, such as a hydrocarbon fluid or a brine, and the reservoir is embedded in two different sub-seafloors.

It should be noted that in some applications, no detectable layers may be found but the background may still exhibit significant resistivity anisotropy in two preferential directions. This type of anisotropy can be referred to as "intrinsic anisotropy" or "micro anisotropy." As described above with respect to macro anisotropy, ignoring the presence of such intrinsic anisotropy when inverting surface electromagnetic survey data can yield large errors in the inverted results, with even the most probable solution—minimum residual error value after inversion corresponding to an unrealistic or simply inaccurate model.

Figure 7:
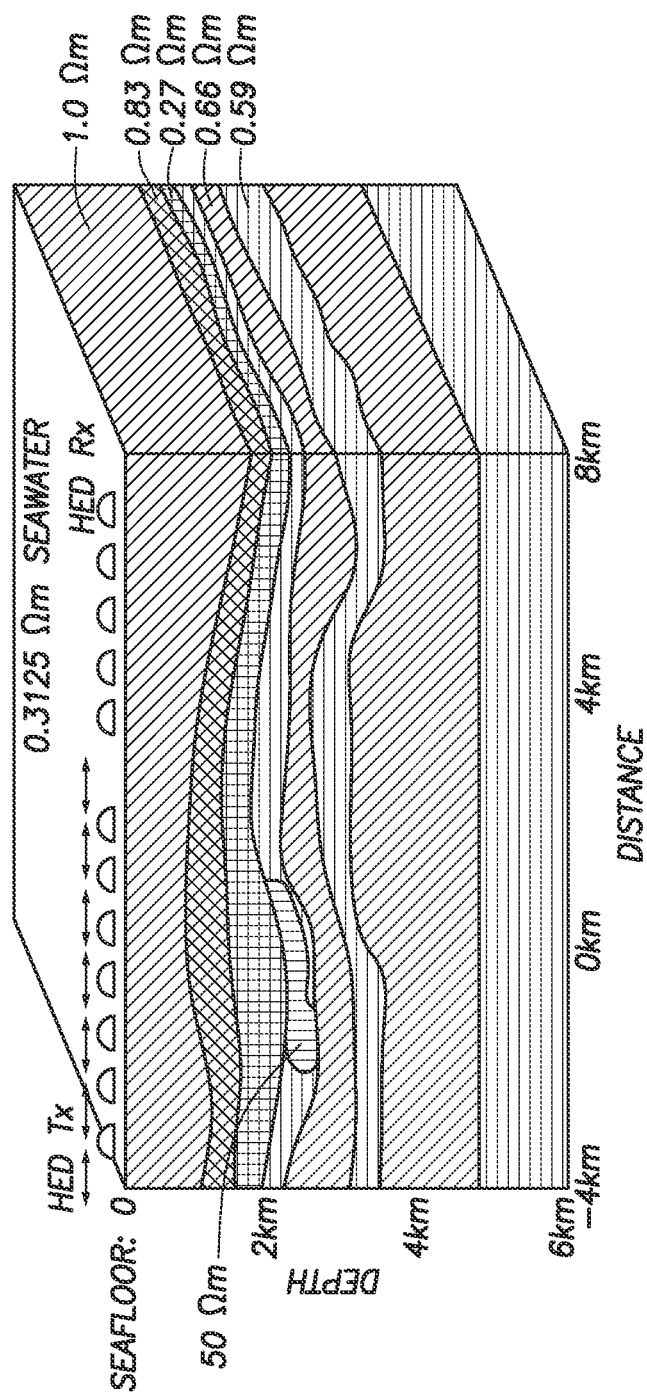
FIG. 7 is a graphical representation of a 2D earth model used for isotropic and anisotropic electromagnetic simulations, according to an embodiment of the present invention.
Figure 8:
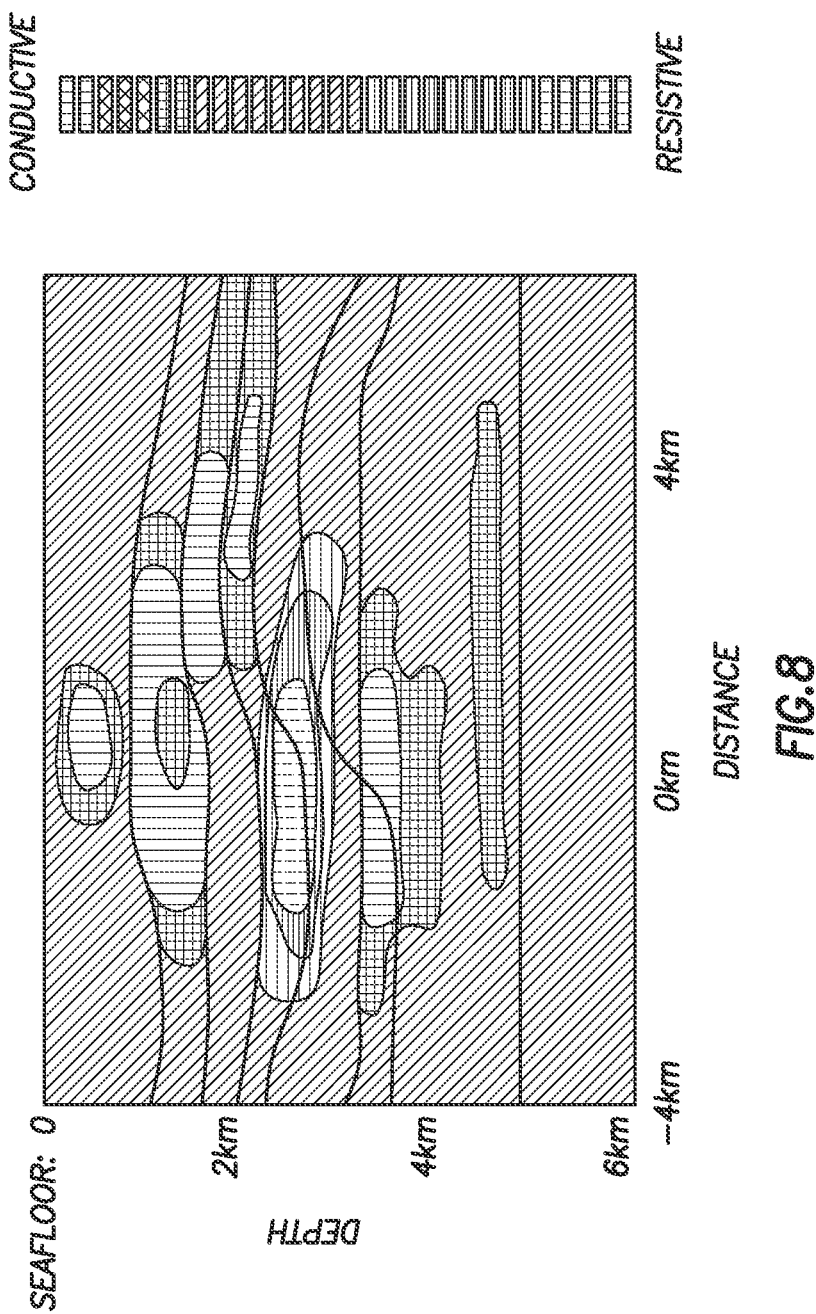
FIG. 8 is a graphical representation showing the results of 2D electromagnetic imaging of isotropic data, according to an embodiment of the present invention.

The introduction of significant errors in the surface electromagnetic inversion due to the presence of resistive or conductive layers that contrast greatly with respect to the assumed homogeneous background resistivity is illustrated by the graphical examples found in FIGS. 7-10. In FIG. 7, for example, an illustration is provided of a 2D earth model used for isotropic and anisotropic electromagnetic simulations. The source and receiver positions are denoted by Tx and Rx, respectively. The results of the 2D electromagnetic imaging of isotropic data are provided in the graph of FIG. 8. The black lines indicate geoelectric boundaries from the true model.

Figure 9:
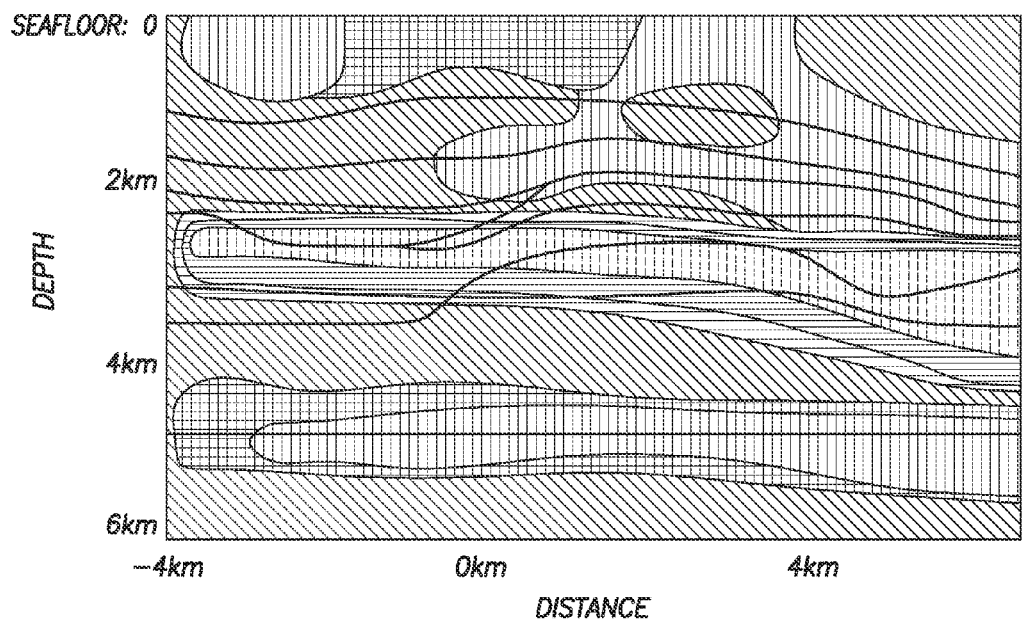
FIG. 9 is a graphical representation showing the results of 2D electromagnetic imaging of anisotropic data using isotropic primary field estimations at each receiver, according to an embodiment of the present invention.
Figure 10:
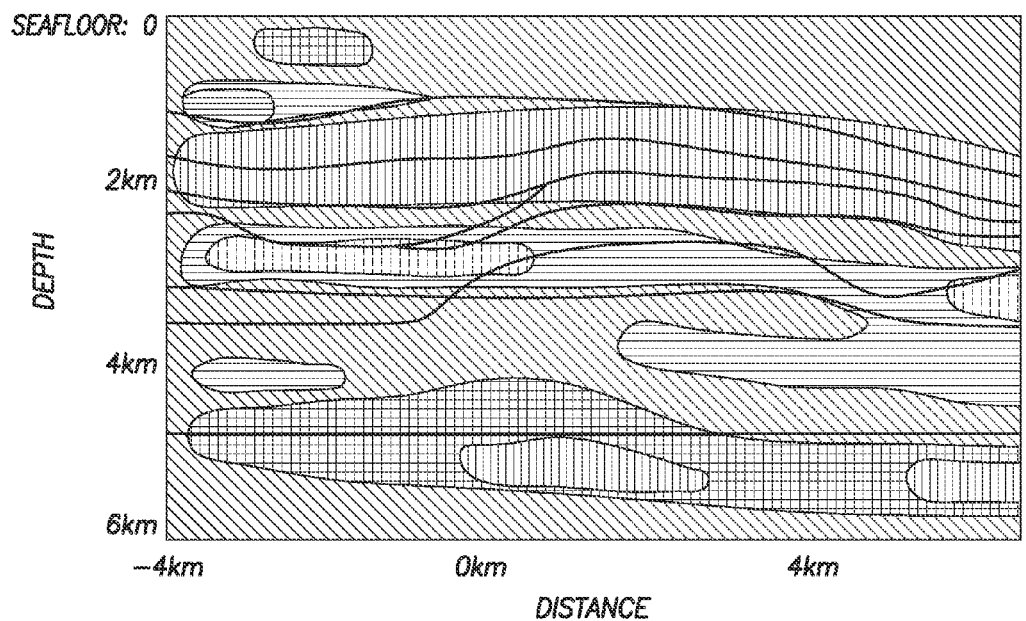
FIG. 10 is a graphical representation showing the results of 2D electromagnetic imaging of anisotropic data using anisotropic primary field estimations at each receiver, according to an embodiment of the present invention.

In FIGS. 9 and 10, another example is provided in which 2D isotropic image results are provided for anisotropic electromagnetic simulations. Referring to FIG. 9, the results of 2D electromagnetic imaging of anisotropic data is provided in which isotropic primary field estimations are used at each receiver. In FIG. 10, the results of 2D electromagnetic imaging of anisotropic data using anisotropic primary field estimations is provided at each receiver. The black lines indicate geoelectric boundaries from the true model.

In at least some applications, 3D electromagnetic surveys may be better suited than 2D surveys. For example, with a simple 2D line of receivers having a source line towed over it, the measurement is primarily sensitive to the vertical anisotropy of the formation. However, some 3D surveys are performed with multiple, parallel 2D lines of receivers and the response is received by the receivers in the receiver line offset from the line being towed over it. As a result, the response becomes significantly affected by the horizontal resistivity of the subsurface with longer offsets providing more sensitivity to this horizontal resistivity and shorter offsets, or in-line receivers, providing more sensitivity to the vertical resistivity.

Figure 11:
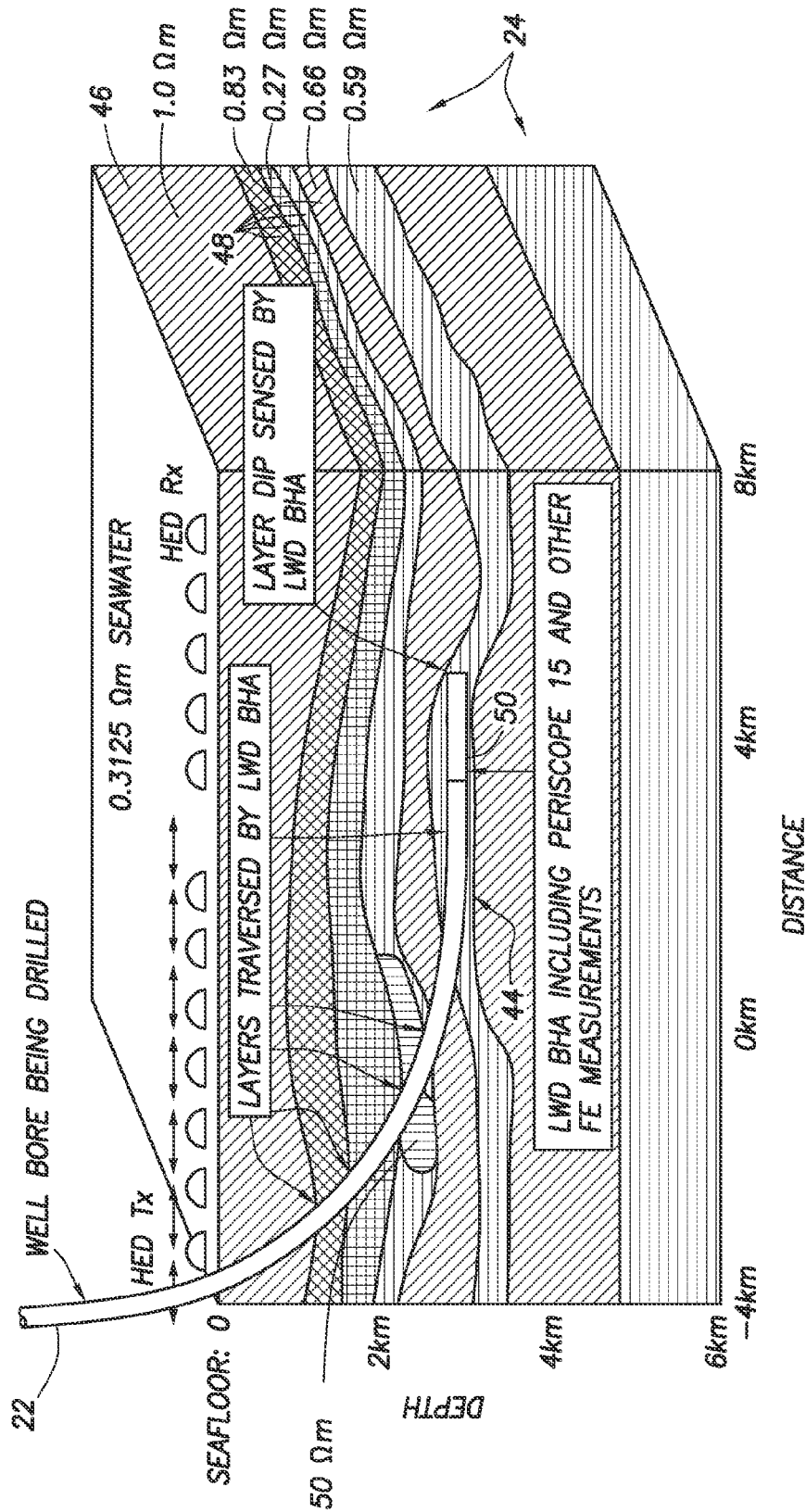
FIG. 11 is a graphical representation showing various types of information that can be obtained while drilling a well to facilitate improvement of the survey of a given subterranean region, according to an embodiment of the present invention.

Referring generally to FIG. 11, a graphical representation is provided to illustrate many types of information that can be acquired while drilling a well. In this example, the wellbore 22 is drilled from a surface platform into a reservoir 44 beneath seawater 46. A variety of measurements can be taken while wellbore 22 is drilled through a plurality of layers 48 of the overall subterranean region 24. At least some of the measurements can be made via a bottom hole assembly 50 that may comprise, for example, a logging while drilling system. Examples of parameters that can be measured/detected from within wellbore 22 include true depth, the crossing of layer boundaries, layer dip, and other measurements, e.g., resistivity, density, porosity, and gravity. Other parameters related to reservoir heterogeneities, e.g., faults, also can be detected. The data from some or all of these measurements is used by processor system 34 to enhance the inversion of surface electromagnetic surveys so as to improve the results obtained by surveys of the subterranean region.

Figure 12:
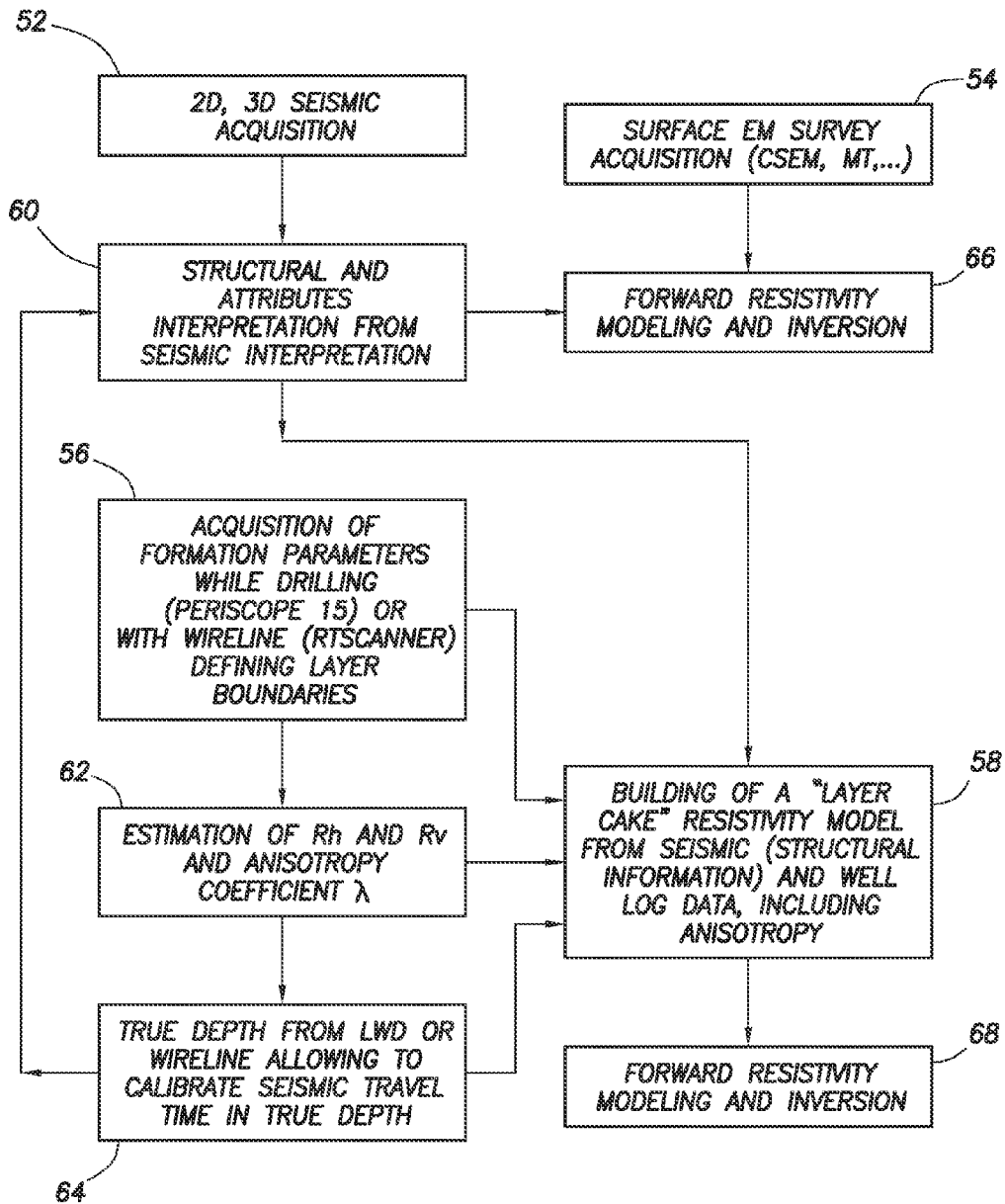
FIG. 12 is a flow diagram representing one example of a methodology for improving surveys of subterranean regions, according to an embodiment of the present invention.

One example of a procedure for improving the surface electromagnetic inversion is illustrated and described with respect to the flowchart of FIG. 12. In this embodiment, a 2D or 3D seismic survey is initially acquired, e.g., conducted, and interpreted, as represented by block 52. The seismic survey can provide information such as a structural information related to reservoir top, reservoir bottom, approximate real depth of detected gas or liquid reservoirs, and other related information. A surface electromagnetic survey, such as a controlled source electromagnetic survey or a magnetotelluric survey, also is conducted as represented by block 54. Additional measurement data also can be obtained or estimated based on data collected from other sensors and instruments. For example, logging while drilling azimuthal propagation measurements and/or wireline tri-axial induction measurements can be obtained to determine/estimate parameters such as true depth, vertical resistivity, horizontal resistivity and layer dip, as represented by block 56.

Based on the acquisition of information from the surveys and the cooperating sensors, a resistivity model is built. In this example, the resistivity model is a layered model, sometimes referred to as a layered-cake model, constructed for the overburden, as represented by block 58. In the absence of logs in the area of interest, this starting model may be constructed using resistivity values obtained from well logs proximate to the area of interest. The layered model may be based at least in part on information acquired from running the measurement tools while the wellbore 22 is drilled toward the target reservoir 44. Furthermore, the geometry of the layered model may be guided by seismic information and dip information gained from the seismic survey data, as represented by block 60. Additionally, values for horizontal resistivity, vertical resistivity, and anisotropy are estimated and assigned for each layer exhibiting micro or intrinsic anisotropy, as represented by block 62. It should be noted that if all layers 48 are isotropic (horizontal resistivity equals vertical resistivity), the model being constructed with layers of different resistivity will automatically cause the overburden to exhibit macro anisotropy. Construction of the layer model also can be affected by true depth measurements obtained via logging while drilling systems or wireline systems to enable calibration of seismic travel time in true depth, as represented by block 64.

A forward model (1D, 2D or 3D) of the surface measured electromagnetic sub-surface survey is then run on processor system 34, for example, without the target reservoir to estimate the value of the primary field, as represented by block 66. This primary field can then be subtracted from the total field to aid in defining a starting model for subsequent inversion. Additionally, a full 1D, 2D or 3D resistivity inversion is run individually or jointly on processor system 34 with seismic data and or gravity data using a detailed description of the overburden resistivity distribution including the intrinsic micro resistivity anisotropy (see block 68). The output of this latter inversion is an improved delineation and estimation of the resistivity of the target reservoir. Furthermore, this latter inversion may be periodically run each time new layers 48 are penetrated. The periodic inversion enables incremental calibration of the layered model similar to the manner in which new seismic inversions may be re-run each time new borehole seismic or density information is available during the drilling process. The calibrations may be in the form of updated surface locations serving as resistive boundaries within the electromagnetic inversion model and/or resistivity values from logs or drilling measurements which can provide a better estimate of the layers recently penetrated.

The results of these inversions may be displayed via processor system 34 on, for example, an output display 42. The output information is used to indicate the certainty of hydrocarbon presence and volume increases or decreases, thus improving the decision-making of, for example, an exploration team. The methodology provides an improvement to the inversion of surface electromagnetic survey data, e.g., controlled source electromagnetic data and magnetotelluric data, to enable better delineation of a reservoir body buried below an unknown overburden.

As described above, the methodology also improves the inversion of surface electromagnetic survey data by estimating the structure of the reservoir layers as well as the spatial distribution of resistivity parallel to the bedding (horizontal resistivity) and perpendicular to the bedding (vertical resistivity) along the trajectory of the well being drilled. The methodology can further improve the inversion of surface electromagnetic surveys by assigning structural information and anisotropic resistivity (vertical and horizontal resistivity) from logging while drilling formation evaluation measurements and from azimuthal propagation resistivity measurements. In similar applications, the methodology improves the inversion of surface electromagnetic surveys by assigning structural information and anisotropic resistivity (vertical and horizontal resistivity) from wireline tri-axial induction measurements.

In other applications, the methodology improves interpretation of surface seismic surveys by incorporating information on structure, heterogeneities, e.g., the presence of faults, and other information which can be used to constrain the surface electromagnetic inversion. The constraints enabled by this methodology result in an improved delineation of a reservoir body buried below an unknown overburden. In some applications, both magnetotelluric and controlled source electromagnetic data are acquired and the magnetotelluric data may contribute to enhanced resolution seismic surveys which further aid in constraining a controlled source electromagnetic inversion.

The methodology and system described herein can be used to improve surface electromagnetic inversions used to obtain data related to subterranean regions. The approach may be used with a variety of systems, tools and sensors to obtain information that facilitates improved inversion results related to target reservoirs and other subterranean features. As described above, many types of information may be used to constrain the surface electromagnetic inversion in a manner that enables improved results. Additionally, the methodology may be employed with a variety of electromagnetic survey systems, seismic survey systems, logging while drilling tools, gravity sensors, and other sensors. Portions of the methodology can be conducted on an iterative basis as additional data is obtained on multiple formation layers during drilling of a wellbore. The methodology also may be used in a wide variety of subsea environments and other environments.

Accordingly, although only a few embodiments of the present invention have been described in detail above, those of ordinary skill in the art will readily appreciate that many modifications are possible without materially departing from the teachings of this invention. Such modifications are intended to be included within the scope of this invention as defined in the claims.

What is claimed is:

1. A method, comprising:
   using a processor to perform an inversion on data from a surface electromagnetic survey acquired using an electromagnetic survey system, wherein performing the inversion comprises using the processor to run a forward model of the surface electromagnetic survey without a target reservoir to estimate a value of a primary field resulting from coupling between a transmitter and a receiver of the electromagnetic survey system, and using the processor to subtract the primary field from a total field obtained during the surface electromagnetic survey to define a starting point for the inversion;

using the processor to constrain a model search space by providing constraints on anisotropy; and using the processor to output results based on the inversion subject to the constraints.

2. The method as recited in claim 1, wherein constraining comprises estimating both a macro anisotropy and an intrinsic anisotropy of an overburden and providing constraints on the macro anisotropy and the intrinsic anisotropy.

3. The method as recited in claim 2, wherein constraining comprises estimating a vertical resistivity, a horizontal resistivity, and a layer dip.

4. The method as recited in claim 3, wherein constraining comprises assigning a value of horizontal resistivity and vertical resistivity for each layer of a layered resistivity model exhibiting micro anisotropy.

5. The method as recited in claim 1, wherein constraining comprises using a layered model of the overburden.

6. The method as recited in claim 1, wherein constraining comprises performing a resistivity inversion with at least one of a seismic data inversion or a gravity data inversion.

7. The method as recited in claim 1, wherein outputting comprises delineating a reservoir body buried below an overburden on a display.

8. A system comprising:

an electromagnetic survey system for acquiring data from a surface electromagnetic survey, the electromagnetic survey system having a transmitter and a receiver;

a processor to:

perform an inversion of the surface electromagnetic survey data by running a forward model of the surface electromagnetic survey without a target reservoir to estimate a value of a primary field resulting from coupling between the transmitter and the receiver, and subtracting the primary field from a total field obtained during the surface electromagnetic survey to define a starting point for the inversion;

constrain a model search space by providing constraints on anisotropy; and output results based on the inversion subject to the constraints on anisotropy.

9. The system of claim 8, wherein constraining comprises estimating both a macro anisotropy and an intrinsic anisotropy of an overburden and providing constraints on the macro anisotropy and the intrinsic anisotropy.

10. The system of claim 9, wherein constraining comprises estimating a vertical resistivity, a horizontal resistivity, and a layer dip.

11. The system of claim 10, wherein constraining comprises assigning a value of horizontal resistivity and vertical resistivity for each layer of a layered resistivity model exhibiting micro anisotropy.

* * * * *